United States Patent
Beaver

(10) Patent No.: US 11,568,175 B2
(45) Date of Patent: Jan. 31, 2023

(54) DYNAMIC INTENT CLASSIFICATION BASED ON ENVIRONMENT VARIABLES

(71) Applicant: Verint Americas Inc., Alpharetta, GA (US)

(72) Inventor: Ian Roy Beaver, Spokane, WA (US)

(73) Assignee: Verint Americas Inc., Alpharetta, GA (US)

(*) Notice: Subject to any disclaimer, the term of this patent is extended or adjusted under 35 U.S.C. 154(b) by 655 days.

(21) Appl. No.: 16/531,350

(22) Filed: Aug. 5, 2019

(65) Prior Publication Data

US 2020/0082204 A1    Mar. 12, 2020

Related U.S. Application Data

(60) Provisional application No. 62/728,144, filed on Sep. 7, 2018.

(51) Int. Cl.
| | |
|---|---|
| *G06K 9/62* | (2022.01) |
| *G06F 40/253* | (2020.01) |
| *G06F 40/55* | (2020.01) |
| *G06F 40/35* | (2020.01) |
| *G06F 17/00* | (2019.01) |

(52) U.S. Cl.
CPC ........... *G06K 9/626* (2013.01); *G06F 40/253* (2020.01); *G06F 40/55* (2020.01); *G06K 9/6256* (2013.01); *G06K 9/6282* (2013.01); *G06F 40/35* (2020.01)

(58) Field of Classification Search
CPC .... G06K 9/626; G06K 9/6256; G06K 9/6282; G06F 40/253; G06F 40/55; G06F 40/35
See application file for complete search history.

(56) References Cited

U.S. PATENT DOCUMENTS

| | | |
|---|---|---|
| 4,914,590 A | 4/1990 | Loatman et al. |
| 5,418,948 A | 5/1995 | Turtle |
| 5,535,120 A | 7/1996 | Chong et al. |
| 5,615,112 A | 3/1997 | Liu Sheng et al. |
| 5,677,835 A | 10/1997 | Carbonell et al. |
| 5,682,539 A | 10/1997 | Conrad et al. |

(Continued)

FOREIGN PATENT DOCUMENTS

| | | |
|---|---|---|
| CN | 103051669 | 4/2013 |
| WO | 2011/088053 | 7/2011 |
| WO | 2017/127321 | 7/2017 |

OTHER PUBLICATIONS

Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.

(Continued)

*Primary Examiner* — Quoc A Tran
(74) *Attorney, Agent, or Firm* — Meunier Carlin & Curfman LLC

(57) ABSTRACT

To prevent intent classifiers from potentially choosing intents that are ineligible for the current input due to policies, dynamic intent classification systems and methods are provided that dynamically control the possible set of intents using environment variables (also referred to as external variables). Associations between environment variables and ineligible intents, referred to as culling rules, are used.

20 Claims, 7 Drawing Sheets

(56) References Cited

U.S. PATENT DOCUMENTS

| | | |
|---|---|---|
| 5,727,174 A | 3/1998 | Aparicio et al. |
| 5,794,050 A | 8/1998 | Dahlgren et al. |
| 6,012,053 A | 1/2000 | Pant et al. |
| 6,112,177 A | 8/2000 | Cosatto et al. |
| 6,144,938 A | 11/2000 | Surace et al. |
| 6,175,829 B1 | 1/2001 | Li et al. |
| 6,282,507 B1 | 8/2001 | Horiguchi et al. |
| 6,285,978 B1 | 9/2001 | Bernth et al. |
| 6,353,817 B1 | 3/2002 | Jacobs et al. |
| 6,388,665 B1 | 5/2002 | Linnett et al. |
| 6,396,951 B1 | 5/2002 | Grefenstette |
| 6,401,061 B1 | 6/2002 | Zieman |
| 6,513,063 B1 | 1/2003 | Julia et al. |
| 6,658,627 B1 | 12/2003 | Gallup et al. |
| 6,661,418 B1 | 12/2003 | McMillan et al. |
| 6,757,362 B1 | 6/2004 | Cooper et al. |
| 6,826,540 B1 | 11/2004 | Plantec et al. |
| 6,829,603 B1 | 12/2004 | Chai et al. |
| 6,834,120 B1 | 12/2004 | LeClerc et al. |
| 6,987,514 B1 | 1/2006 | Beresin et al. |
| 6,999,932 B1 | 2/2006 | Zhou |
| 7,058,902 B2 | 6/2006 | Iwema et al. |
| 7,076,430 B1 | 7/2006 | Cosatto et al. |
| 7,194,483 B1 | 3/2007 | Mohan et al. |
| 7,263,493 B1 | 8/2007 | Provost et al. |
| 7,337,158 B2 | 2/2008 | Fratkina et al. |
| 7,426,697 B2 | 9/2008 | Holecek et al. |
| 7,483,829 B2 | 1/2009 | Murakami et al. |
| 7,536,413 B1 | 5/2009 | Mohan et al. |
| 7,539,656 B2 | 5/2009 | Fratkina et al. |
| 7,548,899 B1 | 6/2009 | Del Favero et al. |
| 7,590,224 B1 | 9/2009 | Gorin et al. |
| 7,599,831 B2 | 10/2009 | Ford |
| 7,610,382 B1 | 10/2009 | Siegel |
| 7,711,547 B2 | 5/2010 | Abir |
| 7,797,146 B2 | 9/2010 | Harless et al. |
| 7,818,183 B2 | 10/2010 | Schoenberg |
| 7,912,701 B1 | 3/2011 | Gray et al. |
| 7,970,663 B2 | 6/2011 | Ganz et al. |
| 8,160,979 B1 | 4/2012 | Evans et al. |
| 8,346,563 B1 | 1/2013 | Hjelm et al. |
| 8,352,266 B2 | 1/2013 | Farmaner et al. |
| 8,401,842 B1 | 3/2013 | Ginzburg et al. |
| 8,433,556 B2 | 4/2013 | Fraser et al. |
| 8,473,420 B2 | 6/2013 | Bohus |
| 8,510,276 B2 | 8/2013 | Haiby et al. |
| 8,519,963 B2 | 8/2013 | Kocienda et al. |
| 8,670,979 B2 | 3/2014 | Gruber et al. |
| 8,677,377 B2 | 3/2014 | Cheyer et al. |
| 8,731,929 B2 | 5/2014 | Kennewick et al. |
| 8,756,326 B1 | 6/2014 | Elberse et al. |
| 8,762,152 B2 | 6/2014 | Bennett et al. |
| 8,819,003 B2 | 8/2014 | Anick et al. |
| 8,930,191 B2 | 1/2015 | Gruber et al. |
| 8,942,986 B2 | 1/2015 | Cheyer et al. |
| 8,943,094 B2 | 1/2015 | Brown et al. |
| 9,117,447 B2 | 8/2015 | Gruber et al. |
| 9,202,171 B2 | 12/2015 | Kuhn |
| 9,501,741 B2 | 11/2016 | Cheyer et al. |
| 2001/0000356 A1 | 4/2001 | Woods |
| 2001/0033298 A1 | 10/2001 | Slotznick |
| 2001/0044751 A1 | 11/2001 | Pugliese et al. |
| 2001/0049688 A1 | 12/2001 | Fratkina et al. |
| 2001/0053968 A1 | 12/2001 | Galitsky et al. |
| 2002/0008716 A1 | 1/2002 | Colburn et al. |
| 2002/0032591 A1 | 3/2002 | Mahaffy et al. |
| 2002/0123994 A1 | 9/2002 | Schabes et al. |
| 2002/0129031 A1 | 9/2002 | Lau et al. |
| 2002/0198885 A1 | 12/2002 | Streepy |
| 2003/0004908 A1 | 1/2003 | Linthicum et al. |
| 2003/0041307 A1 | 2/2003 | Park |
| 2003/0061029 A1 | 3/2003 | Shaket |
| 2003/0088547 A1 | 5/2003 | Hammond |
| 2003/0126089 A1 | 7/2003 | Fukuoka et al. |
| 2003/0126090 A1 | 7/2003 | Fukuoka et al. |
| 2003/0142829 A1 | 7/2003 | Avigni |
| 2003/0212544 A1 | 11/2003 | Acero et al. |
| 2004/0107088 A1 | 6/2004 | Budzinski |
| 2004/0141013 A1 | 7/2004 | Alcazar et al. |
| 2004/0186705 A1 | 9/2004 | Morgan et al. |
| 2005/0027694 A1 | 2/2005 | Sauermann |
| 2005/0054381 A1 | 3/2005 | Lee et al. |
| 2005/0120276 A1 | 6/2005 | Kolawa et al. |
| 2006/0004826 A1 | 1/2006 | Zartler et al. |
| 2006/0020466 A1 | 1/2006 | Cousineau et al. |
| 2006/0036430 A1 | 2/2006 | Hu |
| 2006/0037076 A1 | 2/2006 | Roy |
| 2006/0047632 A1 | 3/2006 | Zhang |
| 2006/0067352 A1 | 3/2006 | John et al. |
| 2006/0074689 A1 | 4/2006 | Cosatto et al. |
| 2006/0074831 A1 | 4/2006 | Hyder et al. |
| 2006/0080107 A1 | 4/2006 | Hill et al. |
| 2006/0092978 A1 | 5/2006 | John et al. |
| 2006/0161414 A1 | 7/2006 | Carignano et al. |
| 2006/0206483 A1 | 9/2006 | Knepper et al. |
| 2006/0253427 A1 | 11/2006 | Wu |
| 2007/0043687 A1 | 2/2007 | Bodart et al. |
| 2007/0100790 A1 | 5/2007 | Cheyer et al. |
| 2007/0106670 A1 | 5/2007 | Yoakum et al. |
| 2007/0130112 A1 | 6/2007 | Lin |
| 2007/0134631 A1 | 6/2007 | Hardy et al. |
| 2007/0156677 A1 | 7/2007 | Szabo |
| 2007/0185702 A1 | 8/2007 | Harney et al. |
| 2007/0197296 A1 | 8/2007 | Lee |
| 2007/0242656 A1 | 10/2007 | Klassen et al. |
| 2007/0265533 A1 | 11/2007 | Tran |
| 2007/0294229 A1 | 12/2007 | Au |
| 2008/0005158 A1 | 1/2008 | Zartler et al. |
| 2008/0010268 A1 | 1/2008 | Liao et al. |
| 2008/0016040 A1 | 1/2008 | Jones et al. |
| 2008/0036756 A1 | 2/2008 | Gaos et al. |
| 2008/0091406 A1 | 4/2008 | Baldwin et al. |
| 2008/0133444 A1 | 6/2008 | Gao et al. |
| 2008/0162498 A1 | 7/2008 | Omoigui |
| 2008/0222734 A1 | 9/2008 | Redlich et al. |
| 2008/0235604 A1 | 9/2008 | Ebert |
| 2008/0243505 A1 | 10/2008 | Barinov et al. |
| 2008/0305815 A1 | 12/2008 | McDonough |
| 2009/0006525 A1 | 1/2009 | Moore |
| 2009/0030800 A1 | 1/2009 | Grois |
| 2009/0063427 A1 | 3/2009 | Zuta et al. |
| 2009/0070103 A1 | 3/2009 | Beggelman et al. |
| 2009/0077488 A1 | 3/2009 | Ording |
| 2009/0089100 A1 | 4/2009 | Nenov et al. |
| 2009/0119095 A1 | 5/2009 | Beggelman et al. |
| 2009/0119587 A1 | 5/2009 | Allen et al. |
| 2009/0157386 A1 | 6/2009 | Zhou |
| 2009/0171923 A1 | 7/2009 | Nash et al. |
| 2009/0182702 A1 | 7/2009 | Miller |
| 2009/0204677 A1 | 8/2009 | Michaelis et al. |
| 2009/0216691 A1 | 8/2009 | Borzestowski et al. |
| 2009/0225041 A1 | 9/2009 | Kida et al. |
| 2009/0227223 A1 | 9/2009 | Jenkins |
| 2009/0228264 A1 | 9/2009 | Williams et al. |
| 2009/0235356 A1 | 9/2009 | Jensen et al. |
| 2009/0248399 A1 | 10/2009 | Au |
| 2009/0271205 A1 | 10/2009 | Finn et al. |
| 2010/0005122 A1 | 1/2010 | Jackson |
| 2010/0030549 A1 | 2/2010 | Lee et al. |
| 2010/0050237 A1 | 2/2010 | Bokor et al. |
| 2010/0070448 A1 | 3/2010 | Omoigui |
| 2010/0070871 A1 | 3/2010 | Liesche |
| 2010/0153398 A1 | 6/2010 | Miller et al. |
| 2010/0169336 A1 | 7/2010 | Eckhoff-Hornback et al. |
| 2010/0218113 A1 | 8/2010 | White et al. |
| 2010/0226490 A1 | 9/2010 | Schultz et al. |
| 2010/0235808 A1 | 9/2010 | Dayan et al. |
| 2010/0281012 A1 | 11/2010 | Imig |
| 2010/0312547 A1 | 12/2010 | Van Os et al. |
| 2011/0046951 A1* | 2/2011 | Suendermann ........ G10L 15/063 704/E15.014 |
| 2011/0071819 A1 | 3/2011 | Miller et al. |
| 2011/0078105 A1 | 3/2011 | Wallace |
| 2011/0119196 A1 | 5/2011 | Ventura |

(56) References Cited

U.S. PATENT DOCUMENTS

| | | |
|---|---|---|
| 2011/0179126 A1 | 7/2011 | Wetherell et al. |
| 2011/0213642 A1 | 9/2011 | Makar et al. |
| 2011/0282664 A1 | 11/2011 | Tanioka et al. |
| 2011/0288947 A1 | 11/2011 | Biran |
| 2011/0301982 A1 | 12/2011 | Green et al. |
| 2011/0307245 A1 | 12/2011 | Hanneman et al. |
| 2012/0016678 A1 | 1/2012 | Gruber et al. |
| 2012/0022872 A1 | 1/2012 | Gruber et al. |
| 2012/0030553 A1 | 2/2012 | Delpha et al. |
| 2012/0041903 A1 | 2/2012 | Beilby et al. |
| 2012/0078891 A1 | 3/2012 | Brown et al. |
| 2012/0110473 A1 | 5/2012 | Tseng |
| 2012/0117005 A1 | 5/2012 | Spivack |
| 2012/0221502 A1 | 8/2012 | Jerram et al. |
| 2012/0245926 A1 | 9/2012 | Montyne et al. |
| 2012/0253825 A1 | 10/2012 | Di Fabbrizio |
| 2012/0265528 A1 | 10/2012 | Gruber et al. |
| 2012/0284040 A1 | 11/2012 | Dupin |
| 2012/0311541 A1 | 12/2012 | Bullard et al. |
| 2013/0017523 A1 | 1/2013 | Barborak |
| 2013/0031476 A1 | 1/2013 | Coin et al. |
| 2013/0046149 A1 | 2/2013 | Gettelman et al. |
| 2013/0152092 A1 | 6/2013 | Yadgar |
| 2013/0204813 A1 | 8/2013 | Master et al. |
| 2013/0254139 A1 | 9/2013 | Lei |
| 2013/0258040 A1 | 10/2013 | Kaytaz et al. |
| 2013/0262467 A1 | 10/2013 | Zhang et al. |
| 2013/0275875 A1 | 10/2013 | Gruber et al. |
| 2013/0283168 A1 | 10/2013 | Brown et al. |
| 2014/0029734 A1 | 1/2014 | Kim et al. |
| 2014/0040748 A1 | 2/2014 | Lemay et al. |
| 2014/0047001 A1 | 2/2014 | Phillips et al. |
| 2014/0053102 A1 | 2/2014 | Lee et al. |
| 2014/0074454 A1 | 3/2014 | Brown et al. |
| 2014/0098948 A1 | 4/2014 | Kulkarni et al. |
| 2014/0115456 A1 | 4/2014 | White et al. |
| 2014/0164476 A1 | 6/2014 | Thomson |
| 2014/0164508 A1 | 6/2014 | Lynch et al. |
| 2014/0181741 A1 | 6/2014 | Apacible et al. |
| 2014/0201675 A1 | 7/2014 | Joo et al. |
| 2014/0244266 A1 | 8/2014 | Brown et al. |
| 2014/0244712 A1 | 8/2014 | Walters et al. |
| 2014/0245140 A1 | 8/2014 | Brown et al. |
| 2014/0282109 A1 | 9/2014 | Wenger et al. |
| 2014/0297284 A1 | 10/2014 | Gruber et al. |
| 2014/0310005 A1 | 10/2014 | Brown et al. |
| 2014/0317502 A1 | 10/2014 | Brown et al. |
| 2014/0337048 A1 | 11/2014 | Brown et al. |
| 2014/0343924 A1 | 11/2014 | Brown et al. |
| 2014/0343928 A1 | 11/2014 | Brown et al. |
| 2014/0365223 A1 | 12/2014 | Brown et al. |
| 2014/0365407 A1 | 12/2014 | Brown et al. |
| 2015/0066817 A1 | 3/2015 | Slayton et al. |
| 2015/0185996 A1 | 7/2015 | Brown et al. |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0363697 A1 | 12/2015 | Spivack |
| 2016/0110071 A1 | 4/2016 | Brown et al. |
| 2016/0132291 A1 | 5/2016 | Bai et al. |
| 2017/0132220 A1 | 5/2017 | Brown et al. |
| 2017/0277993 A1 | 9/2017 | Beaver et al. |
| 2017/0357637 A1 | 12/2017 | Nell et al. |
| 2018/0308476 A1* | 10/2018 | Hirzel ............... G06F 40/35 |
| 2020/0143112 A1* | 5/2020 | Martinez ........... G06F 40/30 |

OTHER PUBLICATIONS

Brill, E., "Transformation-Based Error-Driven Learning and Natural Language Processing: A Case Study in Part-of-Speech Tagging," Association for Computational Linguistics, 1995, 24 pages.

Cassell, J., et al., "Embodied Conversational Agents", MIT Press, 2000, pp. 272 and 275.

Dumoulin, J., "Using Multiple Classifiers to Improve Intent Recognition in Human Chats," MAICS, 2014, 6 pages.

"Frost & Sullivan Commends Next IT for Leading the Virtual Agent Applications Industry in Competitive Strategy Innovation", Frost & Sullivan, 2014, 5 pages.

Guzzoni, D., et al., "Modeling Human-Agent Interaction with Active Ontologies," Spring 2007 AAAI Symposium, 2007, 8 pages.

Kim, Y-B., et al., "Onenet. Joint Domain, Intent, Slot Prediction for Spoken Language Understanding," IEEE Automatic Speech Recognition and Understanding Workshop (ASRU), 2017, 7 pages.

Kim, B., et al., "Two-stage multi-intent detection for spoken language understanding," Multimedia Tools and Applications, 2016, 14 pages.

Krahmer, E., et al., "Problem Spotting in Human-Machine Interaction", IPO, Center for Research on User-System Interaction, Sixth European Conference on Speech Communication and Technology, 1999, 4 pages.

Kuhn, R., et al., "The Application of Semantic Classification Trees to Natural Language Understanding," IEEE Transactions on Pattern Analysis and Machine Intelligence, vol. 17, No. 5, 1995, pp. 449-460.

Langkilde, I., et al., "Automatic Prediction of Problematic Human-Computer Dialogues in 'How May I Help You?'", AT&T Labs Research, 1999, 5 pages.

Lison, P., "Structured Probabilistic Modelling for Dialogue Management," Ph.D. Thesis, Department of Informatics, Faculty of Mathematics and Natural Sciences, University of Oslo, Oct. 30, 2013, 250 pages.

"Meet Jenn, Your Virtual Assistant at alaskaair.com", retrieved on Apr. 13, 2015 at <<http://www.alaskaair.com/content/about-us/site-info/ask-jenn.aspx>>, 2015, 1 page.

"Meet Julia—TAM Airlines' most famous new hire," Case Study, Next IT Corporation, 2015, 2 pages.

Ratnaparkhi, A., "A Maximum Entropy Model for Part-of-Speech Tagging," Conference on Empirical Methods in Natural Language Processing (EMNLP), 1996, 10 pages.

"SGT STAR Wins Intelligent Assistant Award", San Francisco, Calif (PRWEB), PRWEB, 2014,2 pages.

"The Army's Robot Recruiter", Transcript from New York Public Radio, 2014, 3 pages.

Towell, G., et al., Knowledge-Based Artificial Neural Networks, Artificial Intelligence, vols. 69/70, 1994, 29 pages.

Walker, M., et al., "Learning to Predict Problematic Situations in a Spoken Dialogue System: Experiments with How May I Help You?", AT&T Labs Research, NAACL 2000 Proceedings of the 1st North American chapter of the Association for Computational Linguistics conference, 2000, 8 pages.

Wikipedia page "CALO", retrieved on Nov. 15, 2017 at <<https://en.wikipedia.org/wiki/CALO>>, 2017, 5 pages.

"With Alme, Alaska Airlines soars", Case Study, retrieved on Apr. 10, 2015 at <<http://www.nextit.com/media/downloads/Case-study-Alaska-Air.pdf>>, 2015, 3 pages.

\* cited by examiner

DYNAMIC INTENT CLASSIFICATION BASED ON ENVIRONMENT VARIABLES

CROSS-REFERENCE TO RELATED APPLICATIONS

This application claims the benefit of priority to U.S. Provisional Patent Application No. 62/728,144, filed on Sep. 7, 2018, entitled "Dynamic Intent Classification Based on Environment Variables," the contents of which are hereby incorporated by reference in their entirety.

BACKGROUND

Intelligent Virtual Assistants (IVAs) and chatterbots can be implemented in a multitude of ways, but common to all is a component for natural language understanding (NLU), which is used for the translation of user inputs into a semantic representation. Regardless of the means in which the user is interacting with the IVA (keyboard, speech, gestures, etc.), the user input is first converted into text or a numerical feature representation and fed into the NLU component for analysis. The NLU component maps user inputs, or conversational turns, to a derived semantic representation commonly known as the user intention or simply intent. In the context of natural language processing, intent is defined as an interpretation of a statement or question that allows one to formulate the 'best' response to the statement.

The collection of syntax, semantics, and grammar rules that defines how input language maps to an intent within the NLU component is referred to as a language model. The NLU component may perform pre-processing steps such as part-of-speech tagging, stemming, and entity identification (such as proper names or dates) before feeding the text into the language model. Each of these parsers may be trained through machine learning methods or manually constructed by human experts.

There are two primary techniques to construct the language model. The first technique uses rules-based (e.g., human-curated) methods such as regular expressions or grammars to define the structure and content of language associated to a particular intent. By applying these patterns or grammars to the input text, the correct intent can be determined. The intent associated with the matching grammar or pattern is selected in cases where there is no ambiguity. If multiple patterns match, the correct intent may be selected by a scoring mechanism applied to all patterns that match or other means such as ontological methods.

The second technique to construct a language model is through statistical means. Text that is similar to the expected input text is labeled (e.g., by humans) to be associated with particular intentions. This labeled data is then used to train a model of the distribution of input text over the known intentions using various machine learning approaches. Common approaches include support vector machines, neural networks, and decision trees.

For either language model construction technique, the language model can be constructed as a tree, where general knowledge is understood at the root and specific intents at the leaves. For example, statistical models can be trained on language related to particular domains or tasks such as looking up the weather or ordering food. These specialized models can then be leaves under a higher-level model that chooses the domain or task or learned jointly into a single hierarchical model. These trees can be multiple levels deep depending on how many sub-domain layers are modeled.

Regardless of language model design, its purpose is that of selecting the most likely intention given the user input. In this way, it performs intent classification, where each intent known by the NLU component can be considered a class label.

Current practices are to create an intent classifier for a pre-defined set of intents. Regardless of the method used to construct such a classifier, once the classifier is trained, it is static in that it will always classify a user input into one of the known classes (intentions). As language models evolve and expand, this classification task becomes more difficult. When the set of known classes grows to the thousands, it becomes increasingly difficult for the NLU component to correctly select the intent. Additionally, business rules and regulations often require that specific user behaviors or features be mapped to pre-defined intents where they can be handled differently for regulatory compliance, threat handling, or transferred to human customer service agents. Thus, static intent classifiers are time-consuming and expensive.

For example, in the insurance domain, if a user asks an IVA a policy question, the NLU component must select between all known intents, even though that particular user may not be eligible or authorized to access content returned from a large subset of the known intents. This content filtering and access control is typically handled downstream of the NLU component, after the intent is selected. Suppose that of the 2,000 known intents within the language model, only 1,500 were actually eligible for the given user due to their purchased policies, location, or time of day. The NLU component must still consider and correctly eliminate 500 of the possible intents, which, if the language model consists of patterns to be applied, can greatly increase processing time. Regardless of the model type, this consideration between ineligible classes can decrease accuracy as small sets of exceptions may be either unrepresented or poorly represented in the language model training data, leading to false positives.

SUMMARY

To prevent intent classifiers from potentially choosing intents that are ineligible for the current input due to policies, dynamic intent classification systems and methods are provided that dynamically control the possible set of intents using environment variables (also referred to as external variables). Associations between environment variables and ineligible intents, referred to as culling rules, are used.

In an implementation, a dynamic intent classification system is provided. The system includes a database configured to store a plurality of culling rules based on environment variables; and a classifier configured to determine an intent based on a user input and the plurality of culling rules, and output the intent.

Implementations may include some or all of the following features. The database and the classifier are comprised within a computing device. The database and the classifier are comprised within a chatbot. The chatbot is configured to provide a processed language output based on the intent. The classifier is a rule-based classifier, a tree-based classifier, a grammar-based classifier, or a statistically-trained classifier. The environment variables comprise at least one of time of day or input channel. The classifier is dynamically alterable using the culling rules to generate a plurality of culled intents. The classifier comprises a language model, and wherein the classifier is configured to eliminate ineligible intents using the culling rules without retraining or redeployment of the language model.

In an implementation, a method of providing a response to input data using dynamic intent classification based on environment variables is provided. The method includes maintaining a plurality of culling rules based on a plurality of environment variables, at a natural language understanding (NLU) component; receiving an input data at the NLU component; determining an intent for the input data using the culling rules, at a classifier of the NLU component; and outputting the intent.

Implementations may include some or all of the following features. Providing a processed language output, by a chatbot, based on the intent. Receiving the plurality of environment variables at the NLU component, and determining the plurality of culling rules using the plurality of environment variables. Dynamically altering the classifier using the culling rules to generate a plurality of culled intents. The classifier comprises a language model, and further comprising configuring the classifier to eliminate ineligible intents using the culling rules without retraining or redeployment of the language model. Maintaining the plurality of culling rules in storage external to the classifier. The classifier is a rule-based classifier, a tree-based classifier, a grammar-based classifier, or a statistically-trained classifier. The plurality of environment variables comprise at least one of time of day or input channel.

In an implementation, a method is provided. The method includes receiving a plurality of culling rules at a classifier, wherein the plurality of culling rules are based on a plurality of environment variables; and dynamically altering the classifier using the plurality of culling rules.

Implementations may include some or all of the following features. Maintaining the plurality of culling rules in storage external to the classifier. The classifier is a rule-based classifier, a tree-based classifier, a grammar-based classifier, or a statistically-trained classifier. The classifier comprises a language model, and further comprising configuring the classifier to eliminate ineligible intents using the culling rules without retraining or redeployment of the language model.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
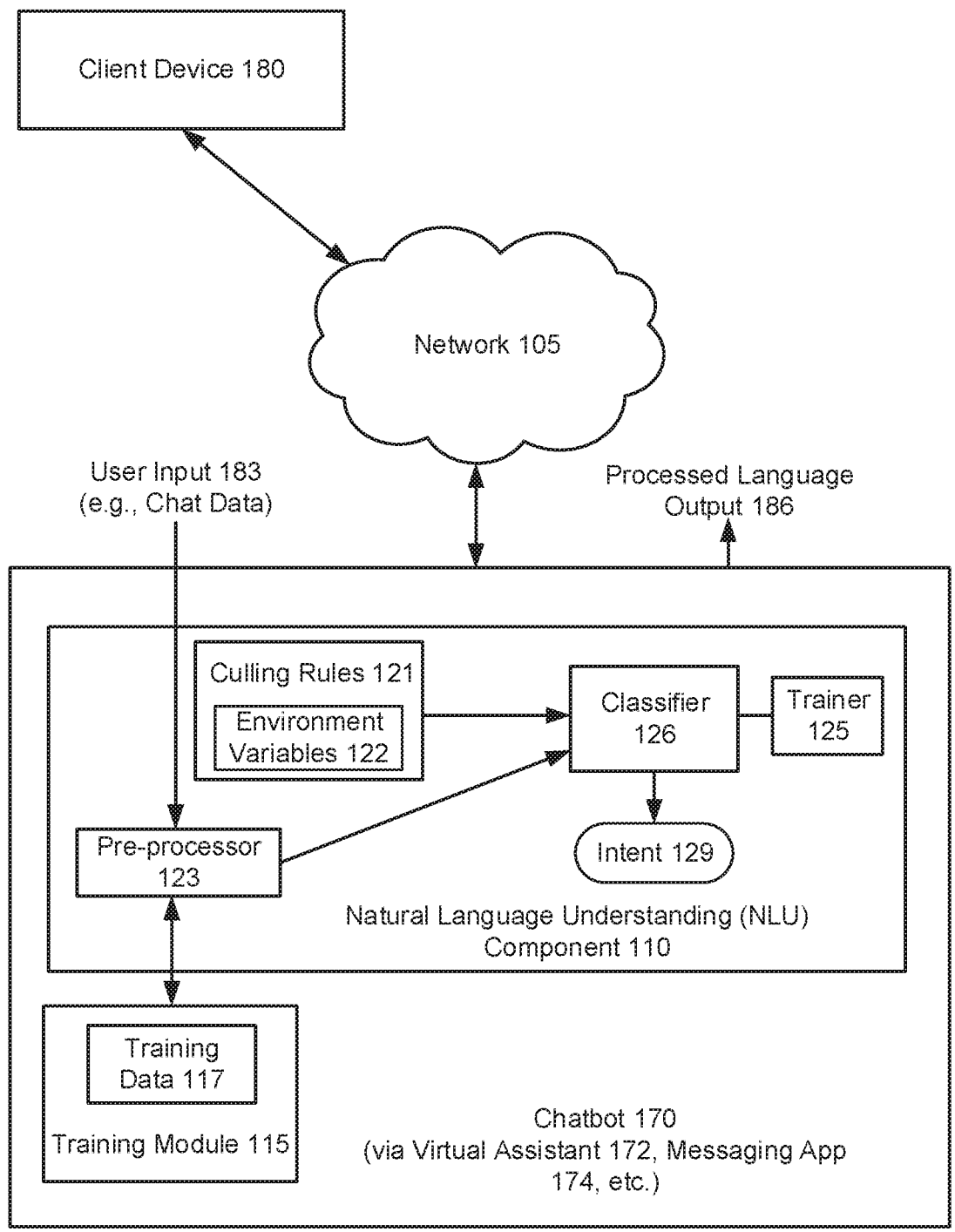
FIG. 1 is an illustration of an exemplary environment for dynamic intent classification based on environment variables.

FIG. 1 is an illustration of an exemplary environment 100 for dynamic intent classification based on environment variables. The environment 100 may include a chatbot 170 and a client device 180 in communication through a network 105. The network 105 may be a variety of network types including the public switched telephone network (PSTN), a cellular telephone network, and a packet switched network (e.g., the Internet). Although only one chatbot 170 and one client device 180 are shown in FIG. 1, there is no limit to the number of chatbots and client devices that may be supported.

Figure 7:
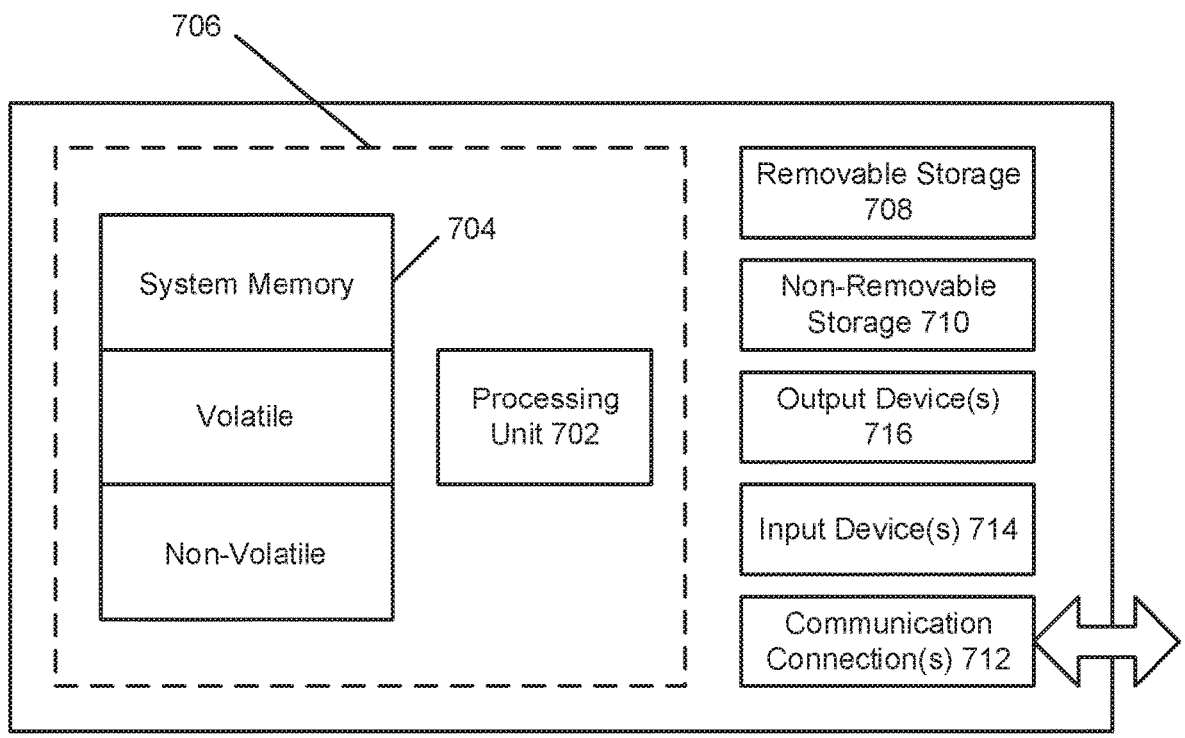
FIG. 7 shows an exemplary computing environment in which example embodiments and aspects may be implemented.

The chatbot 170 and the client device 180 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 7 as the computing device 700.

The chatbot 170 is in communication with the client device 180 and is capable of conducting a conversation with a user through the client device 180. The chatbot 170 may comprise a computer program or artificial intelligence application that conducts a conversation with the client device 180 via textual methods, in an implementation. Alternatively or additionally, the chatbot 170 may conduct a conversation with the client device via auditory methods. Depending on the implementation, the chatbot 170 may be accessed via a virtual assistant 172, a messaging app 174, or by other apps or websites.

The chatbot 170 comprises a natural language understanding (NLU) component 110. The NLU component 110 comprises a classifier 126 that determines and provides an intent 129. As described further herein, the classifier 126 outputs the intent 129. The NLU component 110 further comprises a pre-processor 123 that receives and pre-processes the user input 183 and provides it output to the classifier 126. Culling rules 121, based on or associated with environment variables 122, are also provided to the classifier 126. The environment variables 122, and/or the culling rules 121, may be stored in a database or other memory or storage. The database or other memory or storage is external to the classifier 126, and is accessed by the classifier 126 at runtime. In an implementation, the classifier may be trained by a trainer 125. The trainer 125 may receive and compile prior knowledge and performance information and train the classifier 126 accordingly.

The user input 183, such as chat data, from the client device 180 is provided to the NLU component 110. While chatbots encourage conversational interaction, the user input 183 may also comprise inputs that are keyword searches or non-conversational. Depending on the implementation, the user input 183 may be provided directly from the client device 180 (e.g., via the network 105) or from the chatbot 170 (e.g., via the network 105). The NLU component 110 processes the user input 183 and outputs processed language output 186 using the intent 129. The intent 129 is the user intention which is then used to determine how to respond to that intention. In an implementation, the processed language output 186 may comprise the input's action, object, actor, indirect object, and/or their respective modifying details.

In some implementations, the chatbot 170 comprises a training module 115. The training module 115 may comprise training data 117 and may be used to train the pre-processor 123. The training data 117 may be based on human to virtual assistant chat data. In an implementation, user inputs are captured from a commercial virtual agent chatbot and used for generating the training data 117. This data is typically short inputs ranging from two to 22 words with an average of 8.5 words. These inputs range between keyword searches and more conversational questions. The training data 117 may be weighted toward imperatives, statives, and interrogatives. In an implementation, the training data 117 is hand tagged.

The pre-processor 123 receives and processes the user input data 183 and provides its output to the classifier 126. The classifier 126 considers the output of the pre-processor in conjunction with the culling rules 121, and determines an intent 129 to return (i.e., to output as the intent 129).

The classifier 126 is a dynamic intent classifier, as the culling rules 121 comprises associations between the environment variables 122 and ineligible intents. The classifier uses the culling rules 121 to dynamically control the possible set of intents. In this manner, the classifier 126 is prevented from potentially choosing intents that are ineligible for the current input due to policies, for example.

Figure 2:
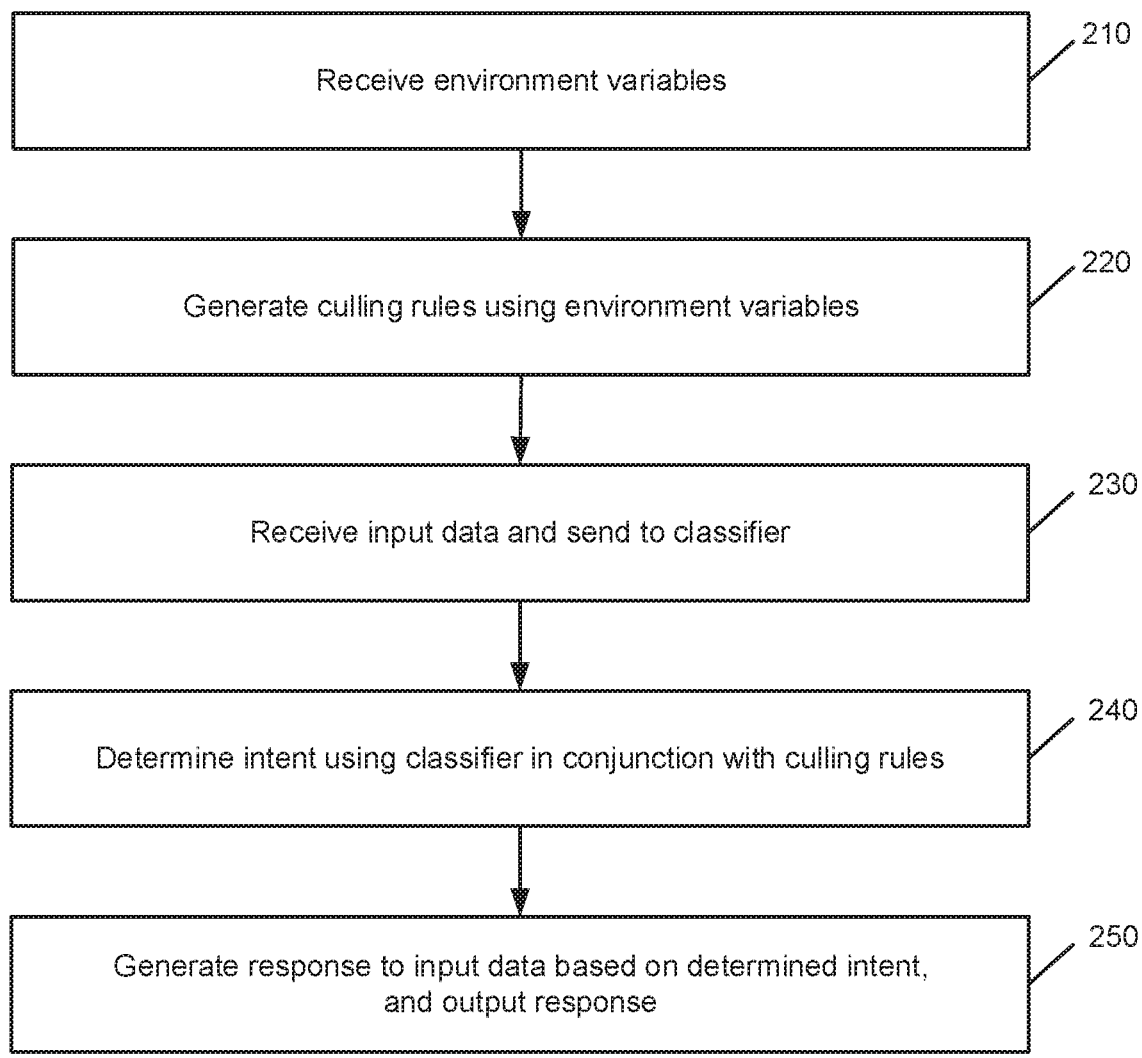
FIG. 2 is an operational flow of an implementation of a method for providing a response to input data using dynamic intent classification based on environment variables.

FIG. 2 is an operational flow of an implementation of a method 200 for providing a response to input data using dynamic intent classification based on environment variables. The method 200 may be implemented using the chatbot 170 in conjunction with the environment 100, in some implementations.

At 210, environment variables 122 are received or otherwise maintained by a natural language understanding (NLU) component, such as the NLU component 110 of the chatbot 170. The environment variables 122 may be stored in storage, such as a memory device or database for example.

At 220, culling rules 121 are generated using the environment variables 122.

At 230, input data, such as the user input 183, is received and sent to the classifier 126. In some implementations, the input data is pre-processed by the pre-processor 123 prior to sending to the classifier 126.

At 240, the intent 129 of the input data is determined by the classifier 126 in conjunction with the culling rules 121.

At 250, the chatbot 170 may generate a response to the input data based on the determined intent 129 and output the response as processed language output 186.

For example, with respect to Example 1, the following culling rules could be used to prevent intents (represented by capital letters) relating to specific retirement plans from being considered based on the current user's ownership of a particular plan. Such a scenario is an example of business logic being leveraged to improve the classification accuracy.

EXAMPLE 1

: has 401k(current user):—A, B, H
: has 403b(current user):—C, D, H (i.e., remove C, D, H from possible intents).
: has RothIRA(current user):—E, F, G, H, I Given these culling rules, if a user were to ask an IVA for a financial company a question about a retirement plan policy, intents known to the classifier 126 that do not apply to retirement plans owned by that user will not even be considered. This can increase classification accuracy by reducing the set of intents to be considered from. It may also speed classification time if the language model is implemented in a rules-based method that requires running all rules against the input and ranking the matches.

In Example 2, the environmental knowledge of which channel the user is talking to the IVA on is used to remove any intents that do not apply to that channel from the language model:

EXAMPLE 2

: is Web(channel):—A, B
: is Voice(channel):— . . .
: is SMS(channel):— . . .

In Example 2, note that some intents are not possible when talking to the IVA over the telephone or texting. In a banking IVA, intent A may be to open a new checking account, which is also not available over texting due to regulatory requirements of identity verification. Similarly, intent B may represent closing an account. Both of those actions are available when talking to the IVA on the company website however, and by removing them from the language model when they are not possible, misunderstandings related to account management when talking to the IVA over telephone or by text can be prevented. Thus, the knowledge of the current user environment is used to reduce the possible intents for the classifier 126 to choose between and lower possible confusion, per user input.

The embodiments disclosed and contemplated herein use a set of culling rules 121 (example of which are given in Examples 1 and 2), to dynamically modify the output of the classifier 126 itself (not invalidate the intent after it has been output by the classifier 126). This set of culling rules 121 can be modified at any time and will take effect immediately without requiring any model retraining or determination of alternative intents. The application of such culling rules 121 is dependent on the classification method used, and different approaches are described herein.

Some embodiments use intent disablement for rules-based intent classifiers. For rule-based approaches, whether manually constructed or empirically machine-learned, it is desirable to modify the model in the classifier 126 itself in order to realize performance gains in addition to increase the accuracy. Any pattern is removed that only applies to the intents that are to be culled. So those intents cannot be obtained by the classifier 126. In other words, it will be impossible for the classifier 126 to get to certain intents, because no pattern exists that will allow the classifier 126 to get to those certain intents.

Figure 3:
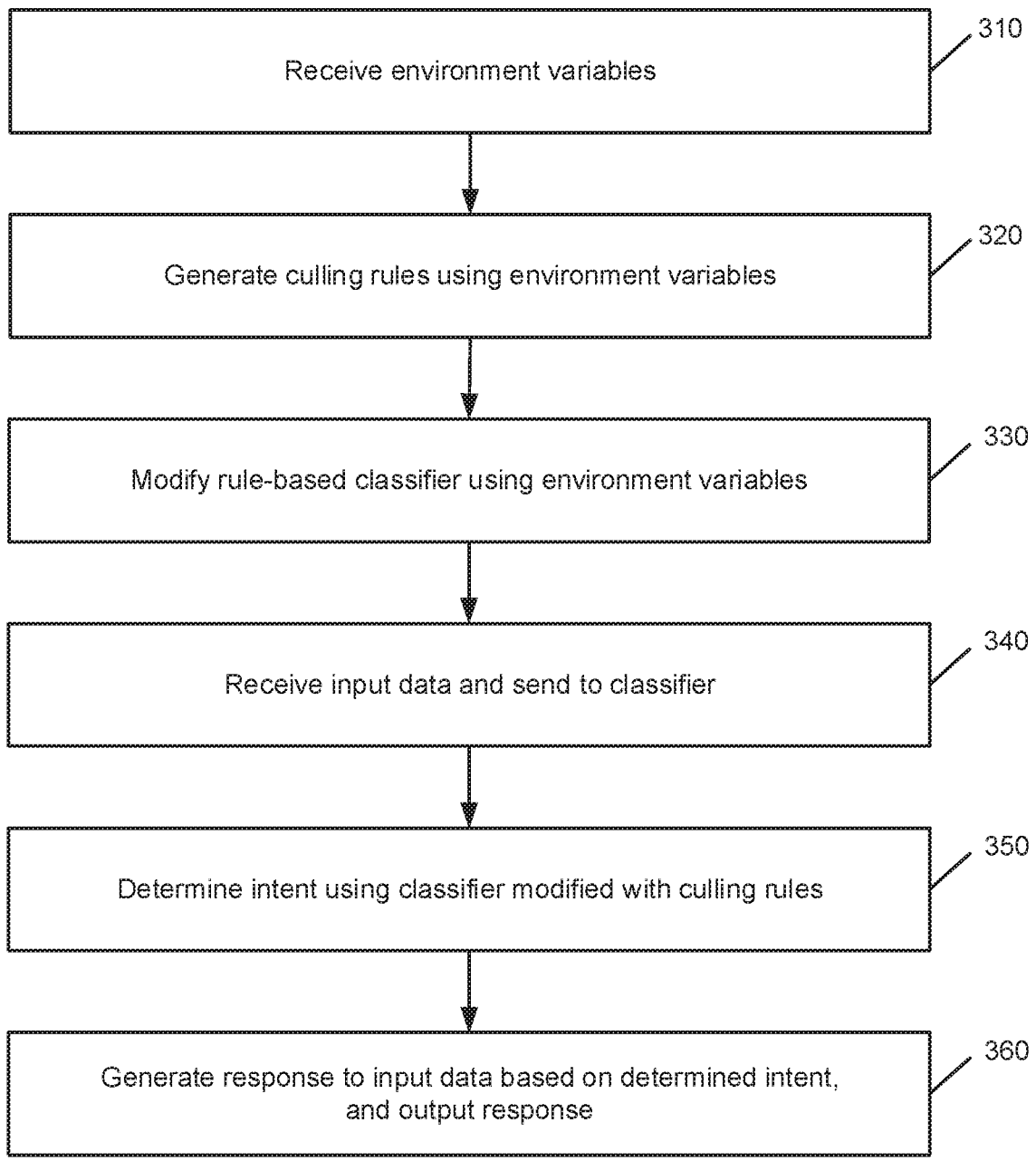
FIG. 3 is an operational flow of an implementation of a rules-based method for providing a response to input data using dynamic intent classification based on environment variables.

FIG. 3 is an operational flow of an implementation of a rule-based method 300 for providing a response to input data using dynamic intent classification based on environment variables. The method 300 may be implemented using the chatbot 170 in conjunction with the environment 100, in some implementations.

At 310, similar to 210, environment variables 122 are received or otherwise maintained by an NLU component, such as the NLU component 110 of the chatbot 170. The environment variables 122 may be stored in storage, such as a memory device or database for example. At 320, similar to 220, culling rules 121 are generated using the environment variables 122.

At 330, the classifier 126, which in this embodiment is a rule-based classifier, is itself modified using the environment variables 122.

At 340, input data, such as the user input 183, is received and sent to the classifier 126. In some implementations, the input data is pre-processed by the pre-processor 123 prior to sending to the classifier 126.

At 350, the intent 129 of the input data is determined by the classifier 126, which has been modified using the environment variables, in conjunction with the culling rules 121.

At 360, the chatbot 170 may generate a response to the input data based on the determined intent 129 and output the response as processed language output 186.

Figure 4:
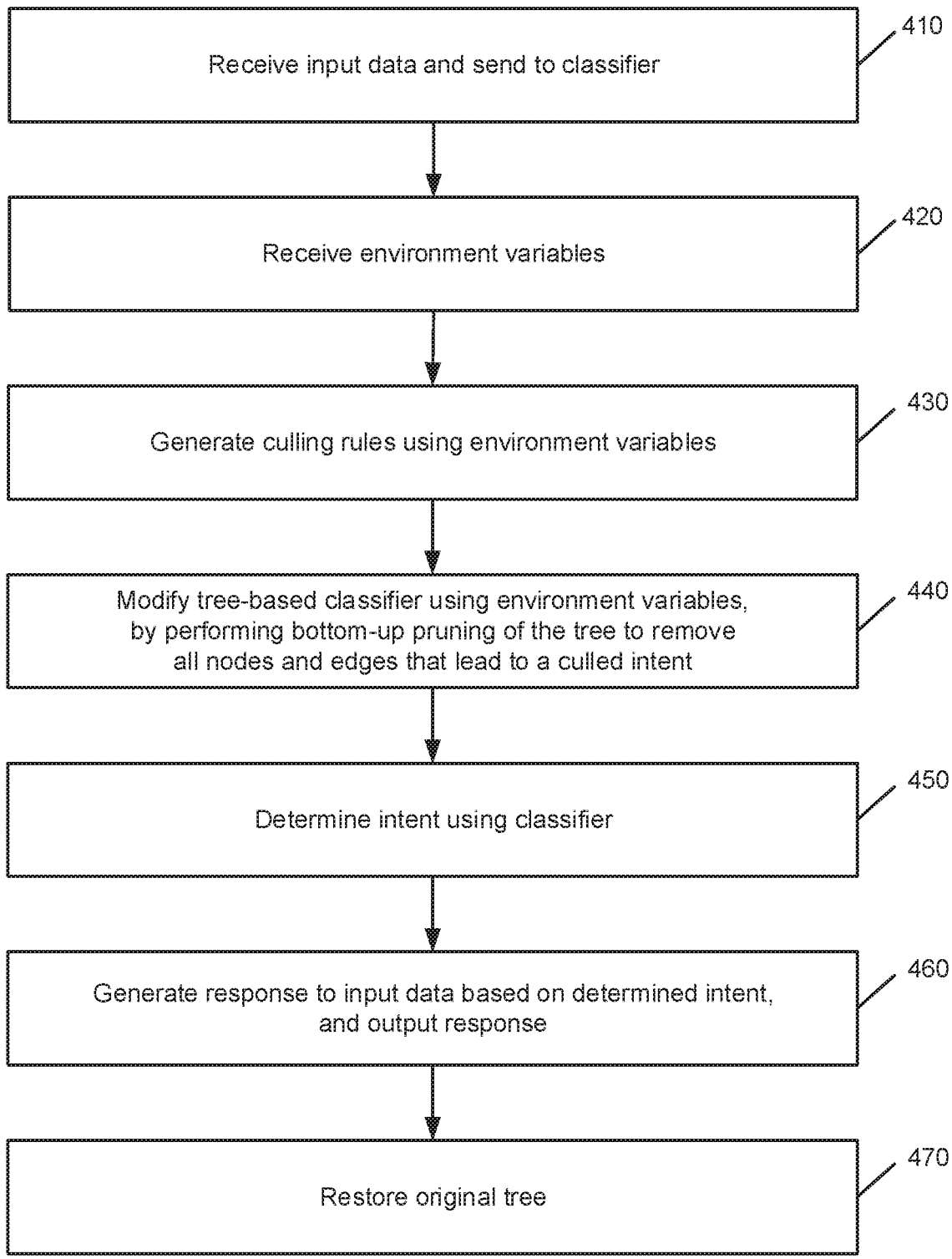
FIG. 4 is an operational flow of an implementation of a tree-based method for providing a response to input data using dynamic intent classification based on environment variables.

For tree-based methods that include decision trees, for example, perform a bottom-up pruning of the tree to remove all nodes and edges that lead to a culled intent. FIG. 4 is an operational flow of an implementation of a tree-based method 400 for providing a response to input data using dynamic intent classification based on environment variables. The method 400 may be implemented using the chatbot 170 in conjunction with the environment 100, in some implementations.

At 410, input data, such as the user input 183, is received and sent to the classifier 126. In some implementations, the input data is pre-processed by the pre-processor 123 prior to sending to the classifier 126.

At 420, environment variables 122 are received or otherwise maintained by an NLU component, such as the NLU component 110 of the chatbot 170. The environment variables 122 may be stored in storage, such as a memory device or database for example.

At 430, culling rules 121 are generated using the environment variables 122.

At 440, the classifier 126, which is a tree-based classifier in this implementation, is modified using the environment variables. The modification may be performed by bottom-up pruning of the tree to remove all nodes and edges that lead to a culled intent.

At 450, the intent 129 of the input data is determined by the classifier 126 in conjunction with the culling rules 121.

At 460, the chatbot 170 may generate a response to the input data based on the determined intent 129 and output the response as processed language output 186.

At 470, the tree is restored to its original unmodified form. In this manner, the modification performed at 440 is removed.

As an example, using the culling set from Example 1, if the current user conversing with the financial IVA does not have a Roth IRA or 403B account, the leaf nodes representing the intentions C, D, E, F, G, H, and I would be pruned from the tree, and the edges and nodes leading to them would be recursively removed until the remaining decision tree had no knowledge of the culled intentions. On the next user input, the original tree is restored and the culling would be applied again based on whatever subset of culling rules corresponded to that input.

Figure 5:
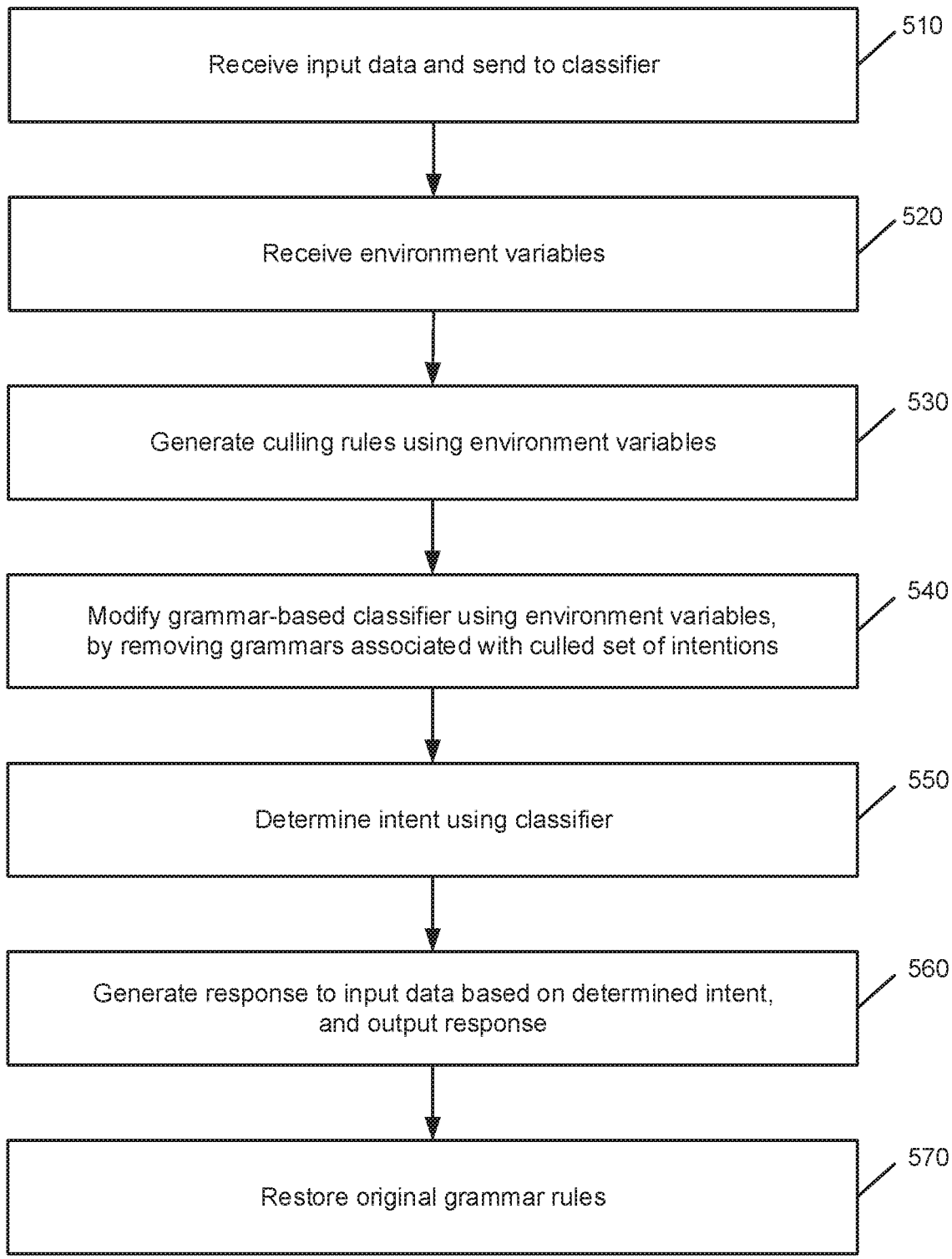
FIG. 5 is an operational flow of an implementation of a grammar-based method for providing a response to input data using dynamic intent classification based on environment variables.

For grammar-based methods, the process is similar, with the difference being all grammars associated with the culled set of intentions would be removed. Any dependent grammars on the culled set would also be removed until the remaining grammars were only used for determining intentions other than the culled set. FIG. 5 is an operational flow of an implementation of a grammar-based method 500 for providing a response to input data using dynamic intent classification based on environment variables. The method 500 may be implemented using the chatbot 170 in conjunction with the environment 100, in some implementations.

At 510, input data, such as the user input 183, is received and sent to the classifier 126. In some implementations, the input data is pre-processed by the pre-processor 123 prior to sending to the classifier 126.

At 520, environment variables 122 are received or otherwise maintained by an NLU component, such as the NLU component 110 of the chatbot 170. The environment variables 122 may be stored in storage, such as a memory device or database for example.

At 530, culling rules 121 are generated using the environment variables 122.

At 540, the classifier 126, which is a grammar-based classifier in this implementation, is modified using the environment variables. The modification may be performed by removing grammars associated with a culled set of intentions.

At 550, the intent 129 of the input data is determined by the classifier 126 in conjunction with the culling rules 121.

At 560, the chatbot 170 may generate a response to the input data based on the determined intent 129 and output the response as processed language output 186.

At 570, the original grammar rules of the classifier are restored to the original unmodified form. In this manner, the modification performed at 540 is removed.

Thus, the language model is dynamically tailored to the business rules, regulations, or environmental variables applicable to each individual user input. Any change to the culling rules 121 have immediate effect, and no external language model refinement is needed.

Some embodiments use intent disablement for statistical intent classifiers. With statistically-trained language models such as support vector machines or neural networks, the language model cannot be dynamically altered without compromising the models performance on the remaining intentions. In addition, the classification time of such models is typically not significantly slowed by the inclusion of more classes. Therefore, focus on eliminating culled intentions from the output distribution of the model. In this way, it is guaranteed that no culled intentions are returned by the model.

Figure 6:
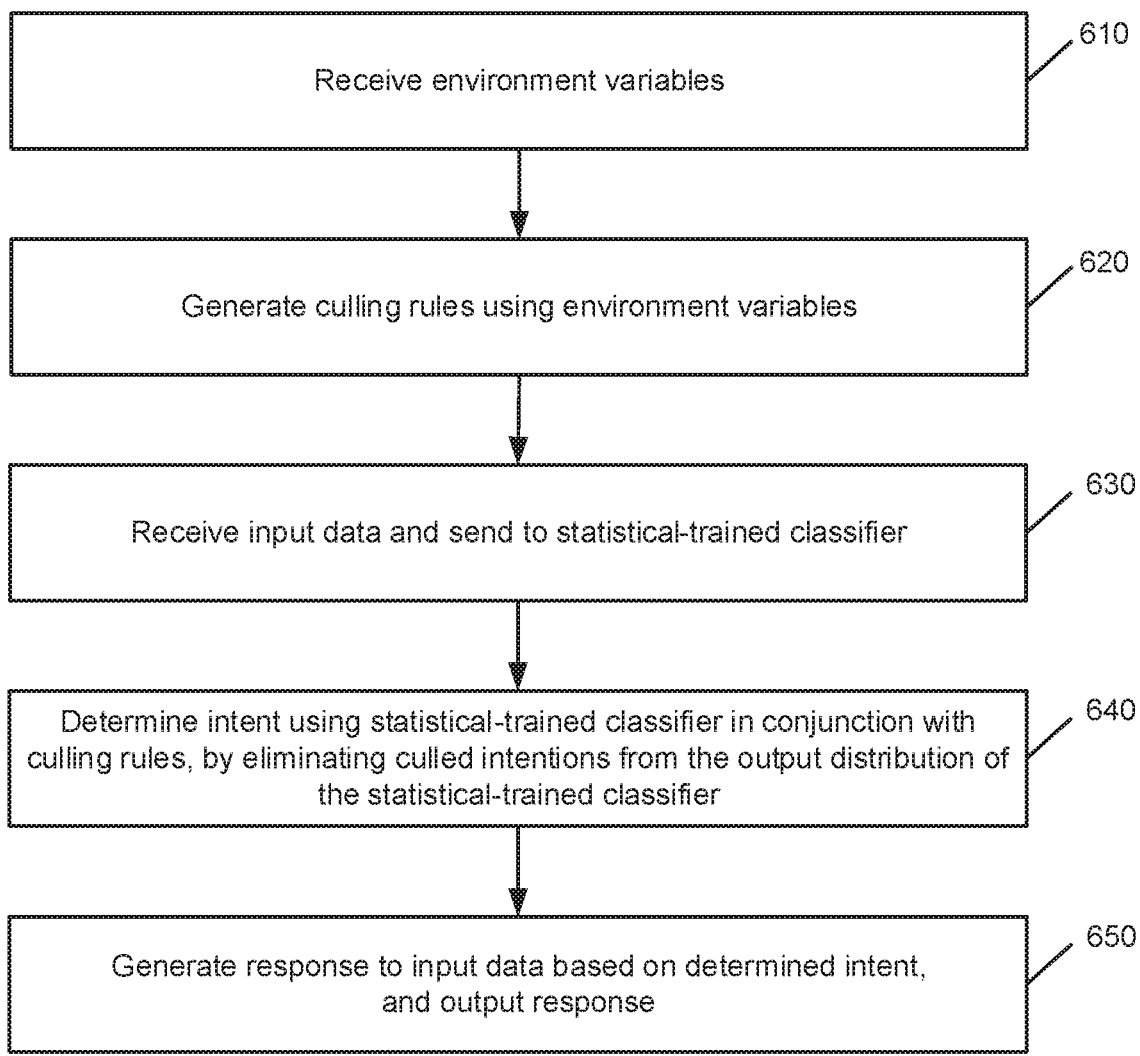
FIG. 6 is an operational flow of an implementation of a statistical-based method for providing a response to input data using dynamic intent classification based on environment variables.

FIG. 6 is an operational flow of an implementation of a statistical-based method for providing a response to input data using dynamic intent classification based on environment variables. The method 600 may be implemented using the chatbot 170 in conjunction with the environment 100, in some implementations.

At 610, environment variables 122 are received or otherwise maintained by an NLU component, such as the NLU component 110 of the chatbot 170. The environment variables 122 may be stored in storage, such as a memory device or database for example.

At 620, culling rules 121 are generated using the environment variables 122.

At 630, input data, such as the user input 183, is received and sent to the classifier 126, which in this implementation is a statistical-trained classifier. In some implementations, the input data is pre-processed by the pre-processor 123 prior to sending to the classifier 126.

At 640, the intent 129 of the input data is determined by the classifier 126 in conjunction with the culling rules 121, by eliminating culled intentions from the output distribution of the classifier 126. In an implementation, to perform the culling, apply a masking layer over the output distribution from a statistical model. This layer performs a bitwise AND operation between the intention scores and the culling mask values. This is very fast to compute and as any culled intentions will have a value of 0 in the bitmask, they will be eliminated from the model output as any value ANDed to 0 will return 0. The downstream components to the NLU component 110 will therefore never see any culled intention, and will select as the winning intent the highest scoring among the non-zero values.

At 650, the chatbot 170 may generate a response to the input data based on the determined intent 129 and output the response as processed language output 186.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/ functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a dynamic intent classification system is provided. The system includes a database configured to store a plurality of culling rules based on environment variables; and a classifier configured to determine an intent based on a user input and the plurality of culling rules, and output the intent.

Implementations may include some or all of the following features. The database and the classifier are comprised within a computing device. The database and the classifier are comprised within a chatbot. The chatbot is configured to provide a processed language output based on the intent. The classifier is a rule-based classifier, a tree-based classifier, a grammar-based classifier, or a statistically-trained classifier. The environment variables comprise at least one of time of day or input channel. The classifier is dynamically alterable using the culling rules to generate a plurality of culled intents. The classifier comprises a language model, and wherein the classifier is configured to eliminate ineligible intents using the culling rules without retraining or redeployment of the language model.

In an implementation, a method of providing a response to input data using dynamic intent classification based on environment variables is provided. The method includes maintaining a plurality of culling rules based on a plurality of environment variables, at a natural language understanding (NLU) component; receiving an input data at the NLU component; determining an intent for the input data using the culling rules, at a classifier of the NLU component; and outputting the intent.

Implementations may include some or all of the following features. Providing a processed language output, by a chatbot, based on the intent. Receiving the plurality of environment variables at the NLU component, and determining the plurality of culling rules using the plurality of environment variables. Dynamically altering the classifier using the culling rules to generate a plurality of culled intents. The classifier comprises a language model, and further comprising configuring the classifier to eliminate ineligible intents using the culling rules without retraining or redeployment of the language model. Maintaining the plurality of culling rules in storage external to the classifier. The classifier is a rule-based classifier, a tree-based classifier, a grammar-based classifier, or a statistically-trained classifier. The plurality of environment variables comprise at least one of time of day or input channel.

In an implementation, a method is provided. The method includes receiving a plurality of culling rules at a classifier, wherein the plurality of culling rules are based on a plurality of environment variables; and dynamically altering the classifier using the plurality of culling rules.

Implementations may include some or all of the following features. Maintaining the plurality of culling rules in storage external to the classifier. The classifier is a rule-based classifier, a tree-based classifier, a grammar-based classifier, or a statistically-trained classifier. The classifier comprises a language model, and further comprising configuring the classifier to eliminate ineligible intents using the culling rules without retraining or redeployment of the language model.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A dynamic intent classification system, comprising:
a processor; and
a memory operably coupled to the processor, the memory having computer-executable instructions stored thereon that, when executed by the processor causes the system to:
generate and store, in a database, a plurality of culling rules based at least in part on environment variables;
receive, at a natural language understanding (NLU) component, a user input;
alter a classifier of the NLU component, wherein the classifier comprises a language model, and wherein the classifier is altered using the plurality of culling rules without retraining or redeployment of the language model;
determine, using the classifier, an intent based at least in part on the user input and the plurality of culling rules; and
output, by the NLU component, a response to the user input based at least in part on the determined intent.

2. The system of claim 1, wherein the database and the classifier are comprised within a computing device.

3. The system of claim 1, wherein the database and the classifier are comprised within a chatbot.

4. The system of claim 3, wherein the chatbot is configured to provide a processed language output based on the intent.

5. The system of claim 1, wherein the classifier is a rule-based classifier, a tree-based classifier, a grammar-based classifier, or a statistically-trained classifier.

6. The system of claim 1, wherein the environment variables comprise at least one of time of day or input channel.

7. The system of claim 1, wherein the classifier is alterable using the culling rules to generate a plurality of culled intents.

8. The system of claim 1, wherein the classifier is configured to eliminate ineligible intents.

9. A method of providing a response to input data using dynamic intent classification based on environment variables, the method comprising:
maintaining a plurality of culling rules based on a plurality of environment variables, at a natural language understanding (NLU) component;
receiving an input data at the NLU component;
altering a classifier of the NLU component, wherein the classifier comprises a language model, and wherein the classifier is altered using the plurality of culling rules without retraining or redeployment of the language model;
determining an intent for the input data using the culling rules, at the classifier of the NLU component; and
outputting, by the NLU component, a response to the input data based at least in part on the determined intent.

10. The method of claim 9, further comprising providing a processed language output, by a chatbot, based on the intent.

11. The method of claim 9, further comprising:
receiving the plurality of environment variables at the NLU component; and
determining the plurality of culling rules using the plurality of environment variables.

12. The method of claim 9, further comprising altering the classifier using the culling rules to generate a plurality of culled intents.

13. The method of claim 9, further comprising configuring the classifier to eliminate ineligible intents using the culling rules.

14. The method of claim 9, further comprising maintaining the plurality of culling rules in storage external to the classifier.

15. The method of claim 9, wherein the classifier is a rule-based classifier, a tree-based classifier, a grammar-based classifier, or a statistically-trained classifier.

16. The method of claim 9, wherein the plurality of environment variables comprise at least one of time of day or input channel.

17. A method comprising:
receiving a plurality of culling rules at a classifier of a natural language understanding (NLU) component, wherein the plurality of culling rules are based on a plurality of environment variables; and
receiving, at the NLU component, a user input;
altering the classifier of the NLU component, wherein the classifier comprises a language model, and wherein the classifier is altered using the plurality of culling rules without retraining or redeployment of the language model;
determining, using the classifier, an intent based at least in part on the user input and the plurality of culling rules; and
outputting, by the NLU component, a response to the user input based at least in part on the determined intent.

18. The method of claim 17, further comprising maintaining the plurality of culling rules in storage external to the classifier.

19. The method of claim 17, wherein the classifier is a rule-based classifier, a tree-based classifier, a grammar-based classifier, or a statistically-trained classifier.

20. The method of claim 17, further comprising configuring the classifier to eliminate ineligible intents using the culling rules.

* * * * *